United States Patent [19]

Ngo et al.

[11] Patent Number: 5,256,281
[45] Date of Patent: Oct. 26, 1993

[54] BAFFLE SYSTEM FOR ANAEROBIC SEWAGE TREATMENT POND

[75] Inventors: Viet Ngo, Minneapolis; Gary L. D'Heilly, Savage, both of Minn.

[73] Assignee: The Lemna Corporation, Mendota Heights, Minn.

[21] Appl. No.: 717,973

[22] Filed: Jun. 20, 1991

[51] Int. Cl.⁵ .................................. C02F 3/32
[52] U.S. Cl. .................... 210/151; 210/170; 210/242.1; 405/52
[58] Field of Search .......... 210/602, 747, 150, 151, 210/170, 242.1, 242.2; 47/1.4, 58–63; 405/52

[56] References Cited

U.S. PATENT DOCUMENTS

| | | | |
|---|---|---|---|
| 3,234,123 | 2/1966 | Hinde | 210/7 |
| 3,385,786 | 5/1968 | Kock | 210/12 |
| 3,770,623 | 11/1973 | Seidel | 210/170 |
| 3,959,923 | 6/1976 | Selke | 47/1.4 |
| 4,209,388 | 6/1980 | DeFraites | 210/170 |
| 4,209,943 | 7/1980 | Moeller et al. | 47/1.4 |
| 4,312,152 | 1/1982 | Drury et al. | 47/63 |
| 4,324,067 | 4/1982 | Kessler | 47/1.4 |
| 4,333,263 | 6/1982 | Adey | 47/1.4 |
| 4,355,484 | 10/1982 | Mandish | 47/58 |
| 4,487,588 | 12/1984 | Lewis, III et al. | 47/59 |
| 4,536,988 | 8/1985 | Hogen | 210/602 |

*Primary Examiner*—Thomas Wyse
*Attorney, Agent, or Firm*—Kinney & Lange

[57] ABSTRACT

A sewage treatment pond has an inlet for introduction of sewage into the pond and an outlet for removal of sewage from the pond. A first baffle extends from the surface of the pond to the bottom of the pond and between the inlet and the outlet. The first baffle has an opening located a first distance from the surface of the pond so that sewage can pass through the opening. A second baffle is located between the inlet and the outlet. The second baffle extends from the surface of the pond to the bottom of the pond. The second baffle has an opening located a second distance from the surface of the pond.

20 Claims, 3 Drawing Sheets

BAFFLE SYSTEM FOR ANAEROBIC SEWAGE TREATMENT POND

INCORPORATED BY REFERENCE

The following references are hereby fully incorporated by reference: an issued U.S. patent entitled FLOATING AQUATIC PLANT WATER TREATMENT SYSTEM, U.S. Pat. No. 5,096,577 by Viet Ngo et al., issued Mar. 17, 1992 and assigned to the same assignee as the present application; and, an issued U.S. patent entitled AQUATIC BIOMASS CONTAINMENT BARRIER AND METHOD OF ASSEMBLING SAME, U.S. Pat. No. 4,536,988 by Delman R. Hogen issued Aug. 27, 1985 and assigned to the same assignee as the present application.

BACKGROUND OF THE INVENTION

The present invention deals with sewage treatment. More particularly, the present invention deals with a baffle system for directing flow in an anaerobic sewage treatment pond and the stabilization of a cover layer on the water surface.

One way in which sewage is presently disposed of involves biologically decomposing undesirable waste materials within the sewage. Anaerobic micro-organisms within the sewage in a sewage treatment pond are allowed to break down organic and inorganic matter. In addition, a cover or mat of organic and/or inert matters, covers the surface of the sewage treatment pond.

Anaerobic sewage treatment ponds suffer from a variety of problems. First, wind and wave action can remove the cover of organic and/or inert matters from the pond, or move it to one side of the pond. With the cover removed from the pond, gases which are produced during the anaerobic treatment process are released thereby disseminating undesirable odors in the pond area. Further, the anaerobic treatment process is temperature dependent. Therefore, if the cover is removed from the pond, heat from the pond is lost in cooler climates. This reduces the effectiveness of the sewage treatment process.

Another problem with prior anaerobic sewage treatment ponds is that wind and wave action on the pond causes erosion of the banks or berms of the pond. This increases the cost of maintaining the pond.

Also, until now, multiple cell anaerobic ponds were normally comprised of a multitude of individual ponds. These individual ponds were required in order to establish the desired current flow within the ponds to adequately treat the sewage. Since multiple ponds were required, the sewage treatment process had multiplicative construction costs because a number of substantially identical ponds needed to be excavated and constructed.

In addition, each of the ponds is lined with a pond lining material. Since multiple ponds were required, the square footage for the multiple liners was increased. Therefore, the lining costs were increased.

SUMMARY OF THE INVENTION

A sewage treatment pond has an inlet for introduction of sewage into the pond and an outlet for removal of partially treated sewage water from the pond. A first baffle extends from the surface of the sewage in the pond to the bottom of the pond between the inlet and the outlet. The first baffle has an opening located a first distance from the surface of the pond so that sewage can pass through the opening. A second baffle is located between the inlet and the outlet. The second baffle also extends from the surface of the sewage to the bottom of the pond. The second baffle has an opening located a second distance from the surface of the pond.

As sewage flows from the inlet to the outlet in the sewage treatment pond, the sewage moves toward the opening in the first baffle. Then, the sewage flows between the first and second baffles to reach the opening of the second baffle. Finally, the sewage flows toward the outlet of the sewage treatment pond. Thus, the location of the openings in the baffles determines the current flow path of the sewage through the pond. This arrangement provides directional changes in the flow path in the pond to achieve a desired current flow path while only requiring the construction of a single pond.

In another embodiment of the present invention, a plurality of sets of baffles are used in the sewage treatment pond. This effectively breaks the pond into a multitude of treatment cells, each cell having a desired current flow path. However, such a system only requires the construction of a single pond.

In another embodiment of the present invention, a floating grid system is installed on the surface of the pond. The grid system stabilizes the surface of the sewage to reduce the effect of wind and wave movement on the pond. Therefore, a stable mat of organic and/or inert materials can grow across the entire surface of the pond. This decreases odors emanating from the pond, helps provide a more constant temperature within the pond, and decreases erosion due to wind and wave action within the pond.

DETAILED DESCRIPTION OF THE PREFERRED EMBODIMENTS

Figure 1:
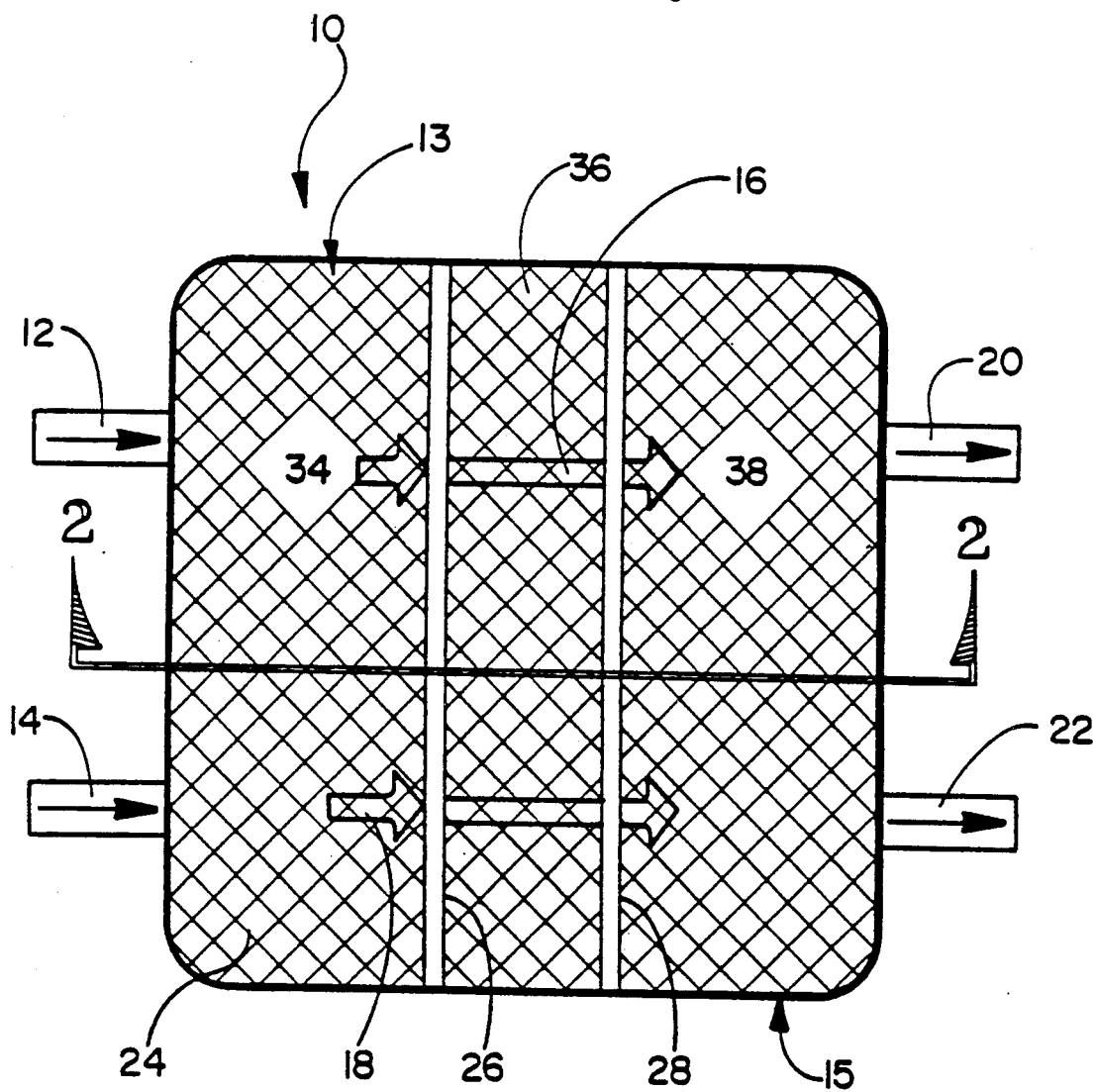
FIG. 1 is a top view of a sewage treatment pond of the present invention.

FIG. 1 shows a top view of a sewage treatment pond 10 of the present invention. Pond 10 is essentially a parallel system having two inlets 12 and 14 for the introduction of sewage into pond 10. Sewage flows through pond 10 through channels 13 and 15 in the direction indicated by arrows 16 and 18. Sewage is removed from pond 10 at outlets 20 and 22.

A grid system 24 is installed on the surface of the sewage in pond 10. The grid system is described in greater detail in the references incorporated by reference in this application. Grid system 24 inhibits wind and wave action on pond 10. Therefore, floating organic and/or insert matters, can accumulate on pond 10 and form a stable mat or cover over pond 10.

Pond 10 also includes a first baffle 26 and a second baffle 28. Baffles 26 and 28 extend substantially the entire width of pond 10 across both channels 13 and 15. Baffles 26 and 28 are disposed generally perpendicular to the direction of the sewage flow within pond 10. Thus, baffles 26 and 28 divide pond 10 into essentially three cells, 34, 36 and 38, respectively. Baffles 26 and 28 have openings (shown in FIG. 2) which direct sewage flow within pond 10 to provide improved treatment of the sewage in pond 10.

Figure 2:
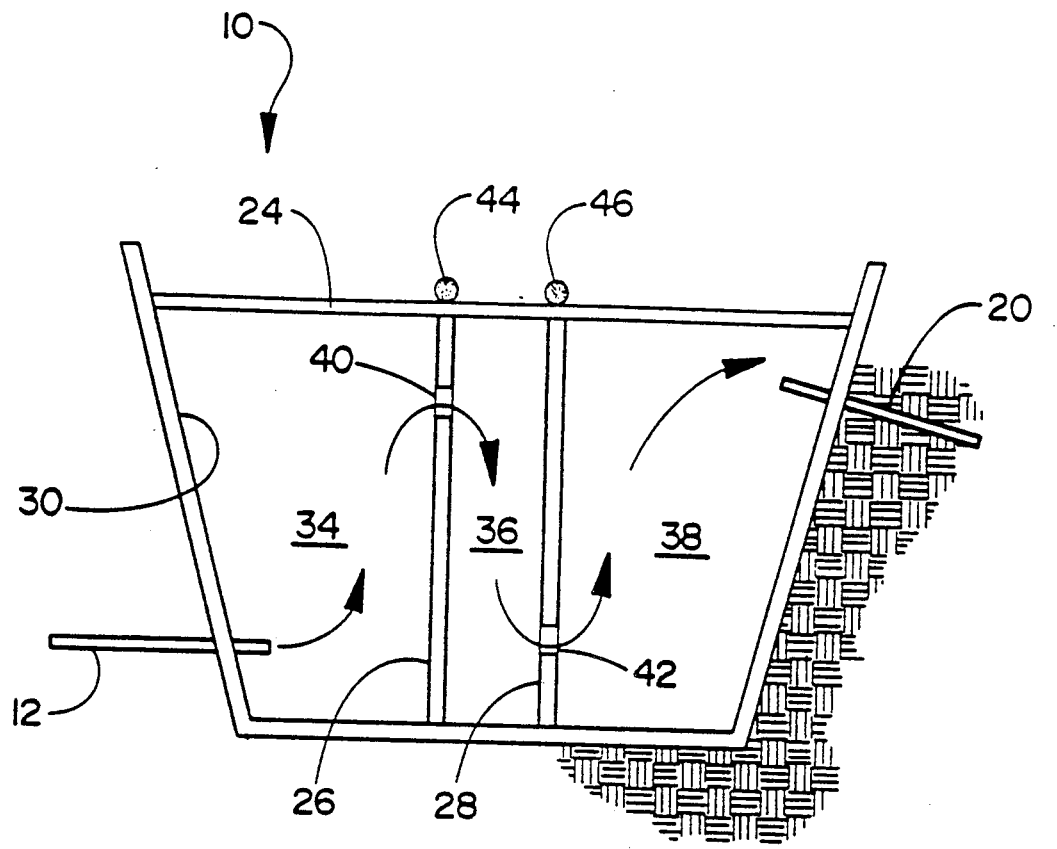
FIG. 2 is a cross sectional view of the sewage treatment pond shown in FIG. 1.

FIG. 2 is a cross sectional view of pond 10 taken along line 2—2 in FIG. 1. FIG. 2 shows that pond 10 includes a pond liner 30. Pond liner 30 is a synthetic membrane that is resistent to domestic waste water and many industrial wastes. In this preferred embodiment, pond liner 30 is a polymer fabric reinforced with a polyester filament yarn or other similar materials.

FIG. 2 also shows that inlet 12 is located near the bottom of pond 10 to provide introduction of sewage into pond 10. The sewage flows generally across pond 10 from inlet 12 to outlet 20. Outlet 20 is located near the surface of the sewage in pond 10. For optimum sewage treatment, it is desirable to have current flowing from the bottom of pond 10 to the top in a majority of pond 10. Therefore, baffle 26 is provided with an opening 40 near the surface of the sewage in pond 10 and baffle 28 is provided with an opening 42 near the bottom of pond 10.

As sewage enters through inlet 12, into cell 34, it flows generally from the bottom of pond 10 toward the surface of pond 10 to the opening 40 in baffle 26. Then, in cell 36, the sewage flows generally downwardly in pond 10 to the opening 42 in baffle 28. Finally, the sewage in pond 10 again flows generally upwardly in cell 38 toward the surface of pond 10 to outlet 20. The sewage is removed from pond 10 at outlet 20.

By placing baffles 26 and 28 in close proximity to one another, openings 40 and 42 in baffles 26 and 28 redirect the sewage flow to provide for upward flow in pond 10 throughout the majority of pond 10 (i.e., in both cells 34 and 38). Thus, pond 10 is effectively broken into two improved treatment cells 34 and 38. Cells 34 and 38 would each have had to be separate ponds in prior sewage treatment systems. However, only a single pond 10 is needed with the present invention.

In this preferred embodiment, baffles 26 and 28 are made of the same material as pond liner 30. Thus, baffles 26 and 28 can be heat sealed or chemically bonded to the bottom and sides of pond liner 30. This effectively prevents short circuiting of the sewage under or around baffles 26 and 28 within pond 10. In addition, baffles 26 and 28 are supported on the surface of the sewage in pond 10 by two foam floatation devices 44 and 46 which may be formed of any suitable foam floatation material. Foam floatation devices 44 and 46 are continuous and attached to grid system 24 on the surface of the sewage in pond 10. Floatation devices 44 and 46 are large enough to support baffles 26 and 28 and also to effectively prevent sewage from running over the top of floatation devices 44 and 46. This also serves to prevent short circuiting of sewage within pond 10.

Openings 40 and 42 in baffles 26 and 28 are preferably formed as a multitude of openings in baffles 26 and 28, respectively. The openings are spread uniformly across the sewage flow pattern in pond 10 to avoid dead spots in the sewage in pond 10 . This reduces the areas of low sewage movement and therefore increases the effectiveness of the treatment process.

Figure 3:
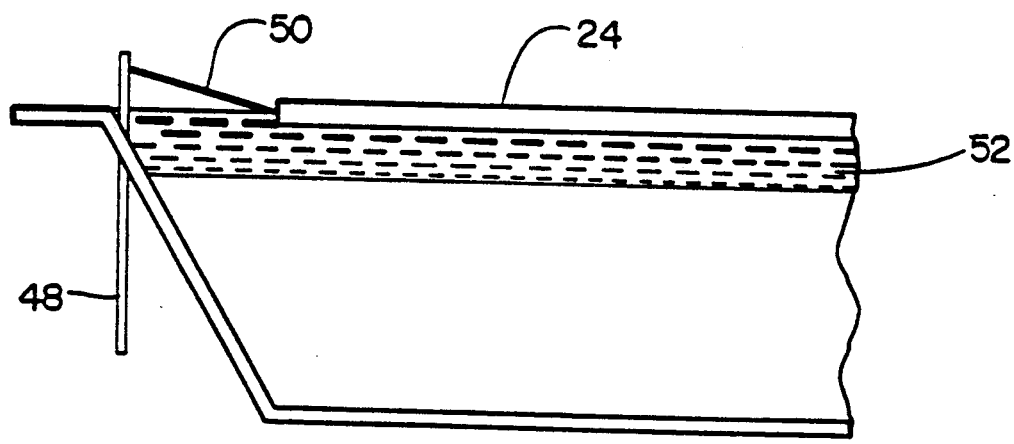
FIG. 3 is a partial cross sectional view of the sewage treatment pond shown in FIG. 1.

FIG. 3 shows a partial cross sectional view of pond 10. The barriers in grid system 24 as well as baffles 26 and 28 are anchored in the side or bank of pond 10 through the use of a plurality of anchor posts 48 and tether lines 50. The use and installation of grid system 24 is described in greater detail in the references incorporated by reference in this application. The barriers in grid system 24 are constructed of high density polyethylene or a similar material. The barriers are designed to float at midheight within pond 10 and form grids which are small enough to dampen the effect of wind and waves in pond 10. This allows the formation or growth of a stable cover or mat 52 of organic and/or inert matter on the surface of the sewage in pond 10. This stable mat reduces heat release and odor release thereby increasing the effectiveness of the sewage treatment process.

Since grid system 24 prevents wind and wave action, it also prevents erosion from the banks or berms of pond 10. This further reduces the cost of maintaining pond 10.

Figure 4:
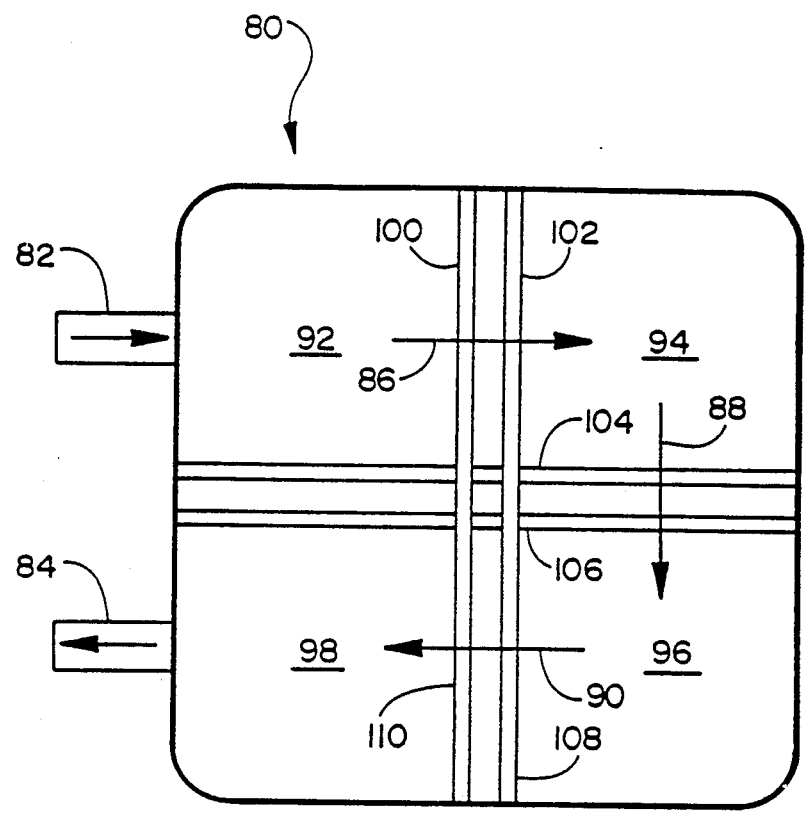
FIG. 4 shows a second embodiment of a multicell sewage treatment pond.

FIG. 4 shows a second embodiment of a sewage treatment pond 80 of the present invention. Pond 80 is shown for the sake of clarity with grid system 24 removed. Pond 80 is a generally circular system having an inlet 82 and an outlet 84. The current flow in pond 80 is indicated by arrows 86, 88 and 90. Pond 80 has essentially three sets of baffles which divide pond 80 into four treatment cells 92, 94, 96 and 98. Sewage is introduced into pond 80 at inlet 82 near the bottom of pond 80. The sewage flows upwardly to an opening in baffle 100. Then, the sewage flows downwardly toward another opening in baffle 102. Through treatment cell 94, the sewage flows generally upwardly again to an opening in baffle 104 and downwardly to an opening in baffle 106. Through treatment cell 96, the sewage again flows generally upwardly to an opening in baffle 108 and downwardly to an opening in baffle 110. Then, in treatment cell 98, the sewage flows generally upwardly toward outlet 84 where it is removed from pond 80. Thus, pond 80 effectively provides four treatment cells while requiring excavation and lining of only a single pond.

Figure 5:
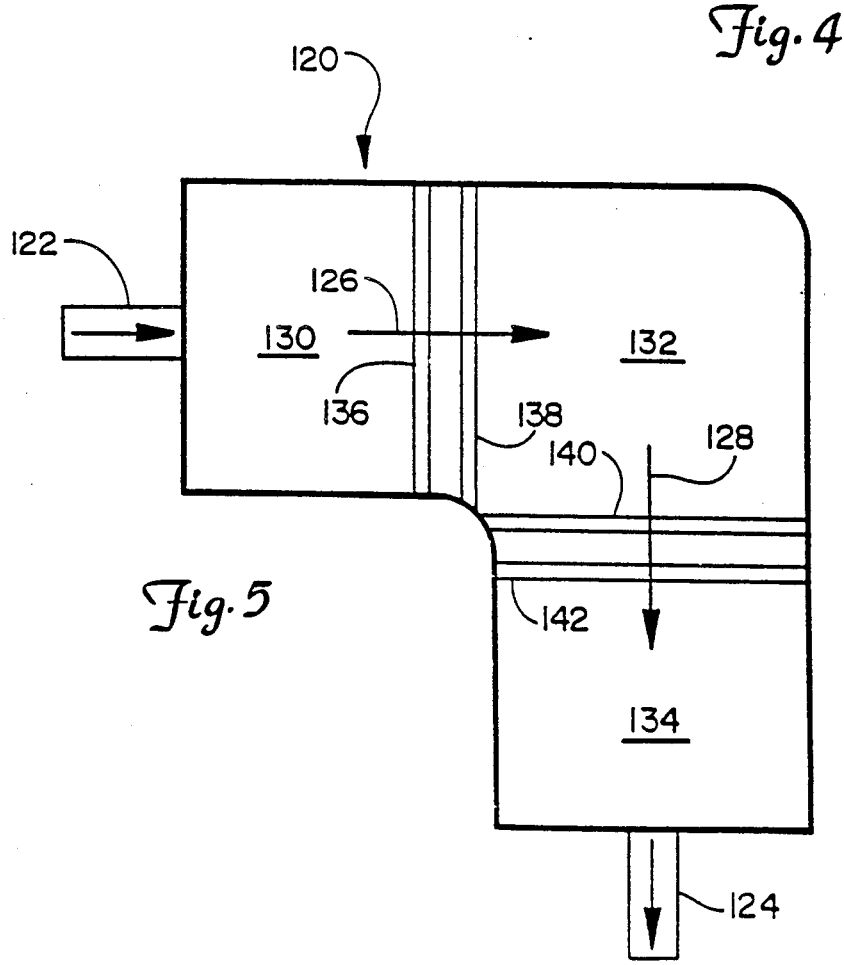
FIG. 5 shows a third embodiment of a multicell sewage treatment pond.

FIG. 5 shows a third embodiment of a sewage treatment pond 120 of the present invention. Sewage treatment pond 120 has an inlet 122 and an outlet 124. The sewage flows through pond 120 generally from inlet 122 to outlet 124 in the direction indicated by arrows 126 and 128. Pond 120 has two sets of baffles which divide pond 120 into three treatment cells 130, 132 and 134. As with the previous embodiments, inlet 122 is located near the bottom of pond 120. Thus, sewage flows in through inlet 122 and toward the surface of pond 130 through an opening in baffle 136. Then, the sewage flows downwardly to an opening in baffle 138. After passing through the opening in baffle 138, the sewage flows generally upwardly through treatment cell 132 and passes through an opening in baffle 140. The sewage then flows downwardly to an opening in baffle 142. Finally, in treatment cell 134, the sewage again flows generally upwardly to outlet 124 which is located near the surface of the sewage in pond 134. The sewage is removed from pond 120 through outlet 124.

In each of these embodiments, it is preferred that grid system 24, the baffles in the sewage treatment ponds, and scum layer are formed of or impregnated with a dark or black material. The black material increases heat retention in the pond thereby increasing the effectiveness of the treatment process. It also decreases heat loss to colder climates.

The sewage treatment pond of the present invention solves many of the problems associated with prior anaerobic sewage treatment ponds. Grid system 24 reduces wave and wind action on the pond and therefore allows a stable mat or cover of organic and/or inert material to form on a surface of the pond. The cover decreases the emissions of gas and odors associated with sewage treatment. It also decreases erosion along the banks of the pond and therefore decreases the cost of maintaining the pond.

The baffles of the present invention direct sewage flow through the pond. By directing sewage flow, the baffles essentially provide multi-pond treatment benefits while only requiring the excavation and construction of a single pond. This drastically decreases the costs of sewage treatment. Similarly, the square footage required for the pond liner is decreased since only a single pond needs to be lined. Thus, the cost of the pond liner material is reduced.

Although the present invention has been described with reference to preferred embodiments, workers skilled in the art will recognize that changes may be made in form and detail without departing from the spirit and scope of the invention.

What is claimed is:

1. A system for treating sewage, comprising:
   a pond for holding the sewage during treatment, the pond having an inlet for introduction of the sewage into the pond, an outlet for removal of the sewage from the pond;
   a first baffle extending from a surface of the sewage in the pond to a bottom of the pond between the inlet and the outlet and having an opening located a first distance from the surface of the sewage so that sewage can pass through the opening; and
   a second baffle, spaced from the first baffle and located between the inlet and the outlet and extending from the surface of the sewage to the bottom of the pond, the second baffle having an opening located a second distance from the surface of the sewage, the first and second baffles forming a flow region therebetween so that sewage flows generally away from the inlet and toward the outlet and from the opening in the first baffle to the opening in the second baffle.

2. The system of claim 1 wherein the first baffle is located between the inlet and the second baffle, and wherein the first distance is less than the second distance so the sewage flowing in the flow region flows generally away from the surface of the sewage.

3. The system of claim 1 and further comprising:
   a plurality of sets of baffles, a first baffle in each set of baffles having an opening the first distance from the surface, and a second baffle of each set of baffles being spaced from and generally parallel to the first baffle in each set of baffles and having an opening the second distance from the surface.

4. The system of claim 1 further comprising: flotation means, coupled to a first end of the first and second baffles, for supporting the first end of the first and second baffles substantially at the surface of the sewage.

5. The system of claim 4 wherein the flotation means comprises:
   a first flotation device coupled to the first end of the first baffle; and
   a second flotation device coupled to the first end of the second baffle.

6. The system of claim 1 further comprising:
   a pond liner lining the pond.

7. The system of claim 6 wherein the first and second baffles each have a second end coupled to the pond liner at substantially the bottom, and sides of the pond.

8. The system of claim 1 wherein the pond has sides, and further comprising:
   a grid system supported at the surface of the sewage and anchored to the sides of the pond, the grid system being employed to dampen waves on the pond, and to help establish a mat of matter on the surface of the sewage.

9. An apparatus for guiding sewage flow in a sewage treatment pond, the pond having an inlet for introducing sewage into the pond and an outlet for removing sewage from the pond, the sewage in the pond having a surface, the apparatus comprising:
   a first baffle extending across the pond between the inlet and the outlet and having an opening a first distance from the surface of the sewage so that sewage can pass through the opening; and
   a second baffle spaced from the first baffle and extending across the pond between the inlet and the outlet and having an opening a second distance from the surface of the sewage wherein the second distance is greater than the first distance, the first and second baffles defining a flow region so that sewage flows from the opening in the first baffle to the opening in the second baffle in a direction generally away from the surface of the sewage and generally toward the outlet.

10. The apparatus of claim 9 wherein the first and second baffles each have a first end extending to the surface of the sewage, and a second end coupled to the bottom of the pond.

11. The apparatus of claim 10 and further comprising:
    a pond liner lining the pond wherein the second end of the first baffle and the second end of the second baffle are coupled to the pond liner.

12. The apparatus of claim 9 further comprising:
    a plurality of sets of spaced baffles extending across the pond between the inlet and the outlet and extending from the surface of the sewage to the bottom of the pond, a first baffle of each set of baffles having an opening so that sewage can pass through the opening and a second baffle of each set of baffles having an opening located a different distance from the surface of the sewage than the opening in the first baffle of each set of baffles, each set of baffles defining a flow region therebetween so that sewage flows from the opening in the first baffle in the set of baffles to the opening in the second baffle in the set of baffles in a direction generally away from the surface.

13. The apparatus of claim 10 further comprising:
    support means for supporting the first end of the first and second baffles substantially at the surface of the sewage.

14. An apparatus for use in a sewage treatment pond, the sewage treatment pond having a surface, sides, an inlet for introduction of sewage into the pond and an outlet for removal of sewage from the pond, the apparatus comprising:
    a grid system supported at the surface of the pond and anchored to the sides of the pond for dampening wave action on the pond to allow growth of plant material on the surface of the pond; and
    a set of spaced, generally parallel baffles extending across the pond between the inlet and the outlet, each of the set of baffles having an opening so that sewage can pass through the openings in the baffles wherein the opening in a first of the set of baffles is located a first distance from the surface of the pond and the opening in a second of the set of baffles is located a second distance from the surface of the pond.

15. The apparatus of claim 14 and further comprising: support means for supporting a first end of each baffle in the set of baffles at the surface of the pond; and coupling means for coupling a second end of each baffle in the set of baffles to the bottom of the pond.

16. The apparatus of claim 15 wherein the support means comprises:
   a first flotation device secured to the first end of the first baffle; and
   a second flotation device secured to the first end of the second baffle.

17. The apparatus of claim 15 and further comprising: a pond liner lining the pond, wherein the coupling means couples the second end of the baffles to pond liner at the bottom of the pond.

18. The apparatus of claim 14 wherein the first baffle in the set of baffles is disposed between the inlet and the second baffle and wherein the first distance is less than the second distance so the sewage flowing between the baffles flows generally away from the surface and generally toward the outlet.

19. The apparatus of claim 18 wherein the openings in the first and second baffles comprise:
   a plurality of spaced openings disposed uniformly along the first and second baffles across the pond.

20. The apparatus of claim 17 wherein the coupling means comprises:
   a heatseal connection between the second end of each baffle in the set of baffles an the pond liner.

* * * * *

UNITED STATES PATENT AND TRADEMARK OFFICE
CERTIFICATE OF CORRECTION

PATENT NO. : 5,256,281

DATED : October 26, 1993

INVENTOR(S) : VIET NGO, GARY L. D'HEILLY

It is certified that error appears in the above-identified patent and that said Letters Patent is hereby corrected as shown below:

On title page, item [56], insert the following after "References Cited" listing other references:

Volume 4, No. 8, August 1987 Operations Forum A WPCF Publication for Wastewater Professionals Signed and Sealed this Twelfth Day of April, 1994

Attest:

BRUCE LEHMAN

Attesting Officer     Commissioner of Patents and Trademarks